United States Patent
Sabin

(10) Patent No.: US 6,575,756 B2
(45) Date of Patent: Jun. 10, 2003

(54) MATHEMATICAL TEACHING APPARATUS

(76) Inventor: Christopher E. Sabin, 46 Birch St., Greenfield, MA (US) 01301

(*) Notice: Subject to any disclaimer, the term of this patent is extended or adjusted under 35 U.S.C. 154(b) by 11 days.

(21) Appl. No.: 09/783,275

(22) Filed: Feb. 10, 2001

(65) Prior Publication Data

US 2001/0055747 A1 Dec. 27, 2001

Related U.S. Application Data

(60) Provisional application No. 60/181,859, filed on Feb. 11, 2000.

(51) Int. Cl.[7] .............................................. G09B 23/02
(52) U.S. Cl. ....................................... 434/208; 434/195
(58) Field of Search ................................ 434/188, 195, 434/196, 211; 446/85, 118

(56) References Cited

U.S. PATENT DOCUMENTS

| | | | | |
|---|---|---|---|---|
| 3,698,122 A | * | 10/1972 | Adams | 434/195 |
| 4,058,912 A | * | 11/1977 | Tacey | 434/188 |
| 4,078,342 A | * | 3/1978 | Cohen | 52/79.1 |
| 4,129,302 A | | 12/1978 | Stone | 273/236 |
| 4,168,583 A | * | 9/1979 | Halpern | 434/188 |
| 4,332,567 A | * | 6/1982 | Nogues | 434/195 |
| 4,504,234 A | | 3/1985 | Jarvis | 434/188 |
| 4,651,993 A | | 3/1987 | Netsch, Jr. | 273/157 R |
| 4,804,187 A | * | 2/1989 | Cramer | 273/157 R |
| 5,108,291 A | * | 4/1992 | Kuo | 434/211 |
| 5,137,452 A | | 8/1992 | Pollock | 434/195 |
| 5,645,431 A | | 7/1997 | Dreyfous | 434/195 |
| 5,868,577 A | | 2/1999 | Aghevli | 434/195 |
| 5,980,258 A | | 11/1999 | Kohlberg | 434/195 |

* cited by examiner

Primary Examiner—Derris H. Banks
Assistant Examiner—Kurt Fernstrom

(57) ABSTRACT

A set of blocks used as an aid for teaching mathematical concepts, in which blocks of different sizes are provided with characteristic dimensions that bear a relationship to preselected numbers in the Fibonacci series. The Fibonacci series is defined as an infinite sequence of numbers starting with 1 that builds by adding the present number to the prior number to form the next number in the series. The first part of the series progresses: 1, 1, 2, 3, 5, 8. 13, 21, 34, 55, . . . , with 0 being understood as the number prior to 1. The series is related to the Golden Ratio of approximately 1:1.618, a ratio found in nature and in certain works of art, by the ratio of adjacent numbers, after thirteen, in the series. The blocks can be used to teach students mathematical concepts such as pattern recognition, the Fibonacci series and related Golden Ratio, and the interrelations between mathematics and other disciplines such as biology, botany, and architecture.

2 Claims, 5 Drawing Sheets

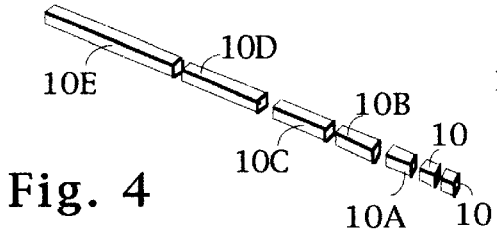
Fig. 4
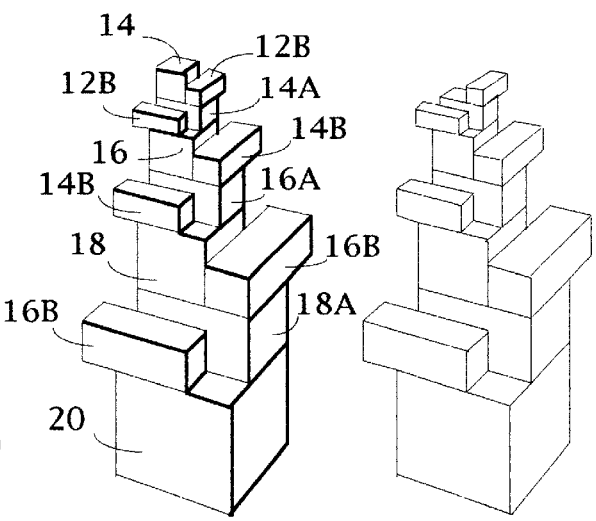
Fig. 6     Fig. 6-A
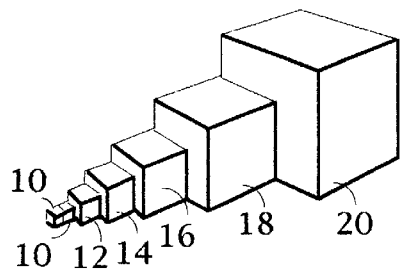
Fig. 5
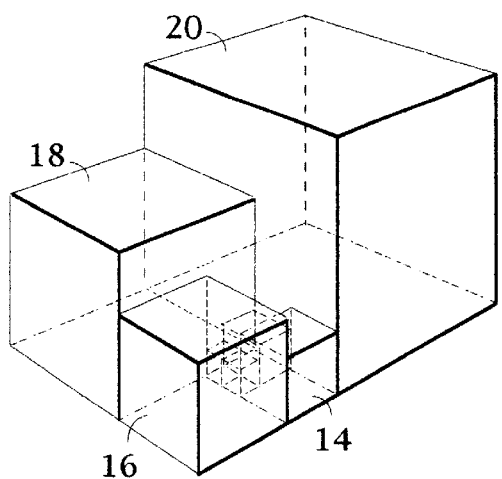
Fig. 7
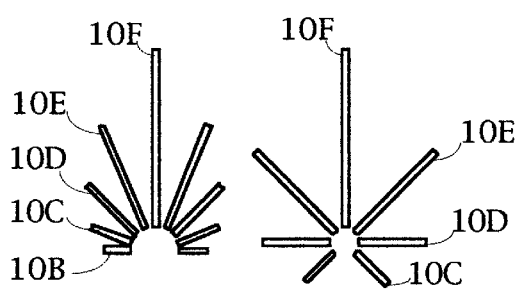
Fig. 8     Fig. 8-A

MATHEMATICAL TEACHING APPARATUS

This application is entitled to the benefit of Provisional Patent Application Ser. No. 60/181,859 filed Feb. 11, 2000.

BACKGROUND

1. Field of Invention

This invention relates to educational devices and more particularly to an apparatus in the form of blocks which can be arranged in various configurations to aid the teaching of mathematical concepts such as: pattern recognition, the Fibonacci series and Golden Ratio, and the inter relatedness of mathematics and other disciplines.

2. Description of Prior Art

In the field of mathematical teaching apparatus, currently referred to as math manipulatives, two and three-dimensional shapes and objects are used to model abstract concepts. It is accepted today in the field of elementary and secondary level teaching that modeling abstract concepts by tangible objects which can be arranged in a number of different configurations facilitates the understanding of concepts. The seeing, touching, and manipulation of these devices by the student acts to translate the abstract concept into a concrete form, thus rendering it from a perspective that is easier to visualize and comprehend.

Presently, there are many math manipulatives available for teachers to aid the learning of the base-ten system, multiplication and division, factorization of polynomials, linear equations, algebra, roots, ratios, patterns, and other concepts.

One concept in the field of secondary level teaching that has gained widespread acceptance recently, yet has few manipulatives to support it, concerns the importance of teaching how disciplines such as mathematics, biology, botany, music, art and architecture are interrelated. A manipulative that could aid the bridging of some or all of these disciplines would be of obvious value.

Another concept currently deemed of importance is the teaching of pattern recognition, a concept now generally thought to be a major element in aquiring problem-solving skills in all disciplines. However, there are few manipulatives presently available to aid the teaching and learning of this vital skill.

Another current trend is the increased attention given the Fibonacci series and the related Golden Ratio, witnessed by the increasing space allotted the subject in math textbooks. The Fibonacci series, named for its discoverer Leonardo "Fibonacci" da Pisa, is an infinite sequence of numbers that starts with 1 and builds by adding the current number to the prior number to produce the next number in the series. For example, the number prior to 1 is accepted to be 0, consequently 1 added to 0 produces the next number, another 1. This 1 is then added to the prior 1 to produce the next number in the series which is 2, and so on infinitely. The first part of the series progresses as follows: 1, 1, 2, 3, 5, 8, 13, 21, 34, 55, 89, 144, 233, 377, . . . .

In the past eight centuries since its discovery, many connections between the Fibonacci series and nature have been identified as well as connections to disciplines such as art and architecture, music, technology, probabilities, and numerous others. The approximate ratio of 1:1.618 of any two adjacent numbers after the thirteenth in the Fibonacci series is also thought to be significantly related to the fields of study previously mentioned. This ratio is virtually the same ratio discovered by the Ancient Greeks, termed the Golden Ratio, and is designated by the Greek symbol Φ (Phi), a tribute to Phidias, the Greek sculptor who most notably used the ratio in proportioning his work. Since that time, many artists, sculptors, architects, and composers have used the Golden Ratio as an aid in proportioning their work.

In the past the subject of the Fibonacci series and the related Golden Ratio has been treated mainly as an interesting curiosity. One possible reason this knowledge has not been used to better advantage is that no effective device was available to aid in the teaching of this concept. Another possible reason is that public awareness of the concept's importance, particularly regarding its applications in science and computer technology is very recent, consequently there has been little perceived need until now to develop relative teaching devices at the secondary level.

Some examples of teaching apparatus, games, toys, and devices employing blocks or shapes pertaining to mathematics in general or the Fibonacci series and Golden Ratio in particular are as follows:

W. H. Adams in U.S. Pat. No. 3,698,122 dated Oct. 17, 1972, discloses playing blocks for young children comprising squares, cubes and discs with dimensions related to one another by the Golden Ratio. While this invention may be suitable for toy building blocks, the scarcity of shapes provided limits its scope and effectiveness as an educational device.

G. B. Stone in U.S. Pat. No. 4,129,302 dated Dec. 12, 1978 discloses a game consisting of a set of playing pieces with lengths corresponding to consecutive numbers in the Fibonacci series. However, these pieces have little utility as teaching aids and there is no reference made to that regard.

M. E. Cohen in U.S. Pat. No. 4,078,342 dated Mar. 14, 1978 discloses a series of elements with sizes based on the Fibonacci series for use as a system to dimension architectural components for the purpose of economy. No mention is made concerning the use of this system as an eductional device.

P. S. Nogues in U.S. Pat. No. 4,332,567 dated Jun. 1, 1982 discloses a mathematical teaching apparatus comprising a cubic block array consisting of layers of various sized blocks with dimensions being multiples of a base unit cube. This device may be useful in teaching arithmetic, analytical and metric geometry, cubing and elementary algebra, however there is no mention of its use nor would it be suitable in teaching the Fibonacci series and the related Golden Ratio, pattern recognition, or the relationship of math to other disciplines. Also, the large number of blocks involved in the complete system makes it expensive to manufacture and difficult to manage in the classroom.

A. B. Jarvis in U.S. Pat. No. 4,504,234 dated Mar. 12, 1985 discloses a mathematical learning aid comprised of squares and cubes useful in learning mathematical operations. There is no mention of its use in teaching pattern formation, connections between mathematics and other disciplines, or the Fibonacci series and Golden Ratio.

W. A. Netsch, Jr. in U.S. Pat. No. 4,651,993 dated Mar. 24, 1987 discloses a design game using modules of the same shape at varying scales relative to a mathematical sequence such as the Fibonacci series useful in making designs for aesthetic purpose. The individual pieces of the game are restricted to being the same shape. Their is no reference of use as an educational device and the game would not be suitable as such.

C. Pollock in U.S. Pat. No. 5,137,452 dated Aug. 11, 1992 discloses interlocking blocks for teaching arithmetic to children. Although this block system may be suitable for teaching addition, subtraction, mutiplication, and division it is not suitable for teaching the Fibonacci series, pattern recognition, or the ways in which math is connected to other disciplines and makes no reference in that regard.

R. Dreyfous in U.S. Pat. No. 5,645,431 dated Jul. 8, 1997 discloses a teaching apparatus comprised of four-sided members useful for visualizing the rules of mathematical expressions. Again, there is no mention of the Fibonacci series and Golden Ratio, pattern recognition, or math connections, or any use thereof.

B. B. Aghevli in U.S. Pat. No. 5,868,577 dated Feb. 9, 1999 discloses a teaching device comprised of cubes, rectangular and triangular solids, and rectangular mats used for teaching factoring and other mathematical skills.

E. Kohlberg in U.S. Pat. No. 5,980,258 dated Nov. 9, 1999 discloses a mathematical teaching apparatus and method comprising block elements having related proportions for teaching counting and addition concepts.

All the devices described above are not suitable as aids in teaching pattern recognition, the ways in which mathematics is related to other disciplines, or for modeling the Fibonacci series and the Golden Section.

SUMMARY OF THE INVENTION

The reader will see that I have provided a block system for teaching and learning the mathematical concepts of pattern recognition, the Fibonacci series and the related Golden Ratio, and the interrelations between mathematics and other disciplines such as biology, botany, and architecture.

OBJECTS AND ADVANTAGES

Accordingly, one object and advantage of the present invention is to provide a teaching apparatus employing a plurality of blocks which can be easily arranged in different configurations to aid the teaching of pattern recognition.

Another object is to provide an effective teaching device useful for demonstrating and modeling certain relationships that exist between mathematics and other disciplines.

Still another object of the present invention is to provide a set of blocks which can be used to model the Fibonacci series and related Golden Ratio in a clear and concise manner.

Further objects are to provide a set of aesthetically pleasing blocks comprising a numerous variety of shapes and sizes which are inexpensive to manufacture and purchase, are enjoyable to use and easily stored away in the holding tray provided when not in use.

These and other objects and advantages will become apparent from a reading of the following description taken in conjunction with the accompanying drawings.

BRIEF DESCRIPTION OF DRAWINGS

FIG. 4 is a perspective view of a configuration of seven 1 cm blocks.

FIG. 5 is a perspective view of seven cubic blocks.

FIG. 6 is a perspective view of thirteen blocks arranged in sequence.

FIG. 6-A is a perspective view of twelve blocks representing three sequences.

FIG. 7 is a perspective view of seven cubes placed in spiral configuration.

FIG. 8 is a top view of an array of nine 1 cm blocks of various length.

FIG. 8-A is a top view of an array of seven 1 cm blocks of various length.

REFERENCE NUMERALS IN DRAWINGS

Figure 1:
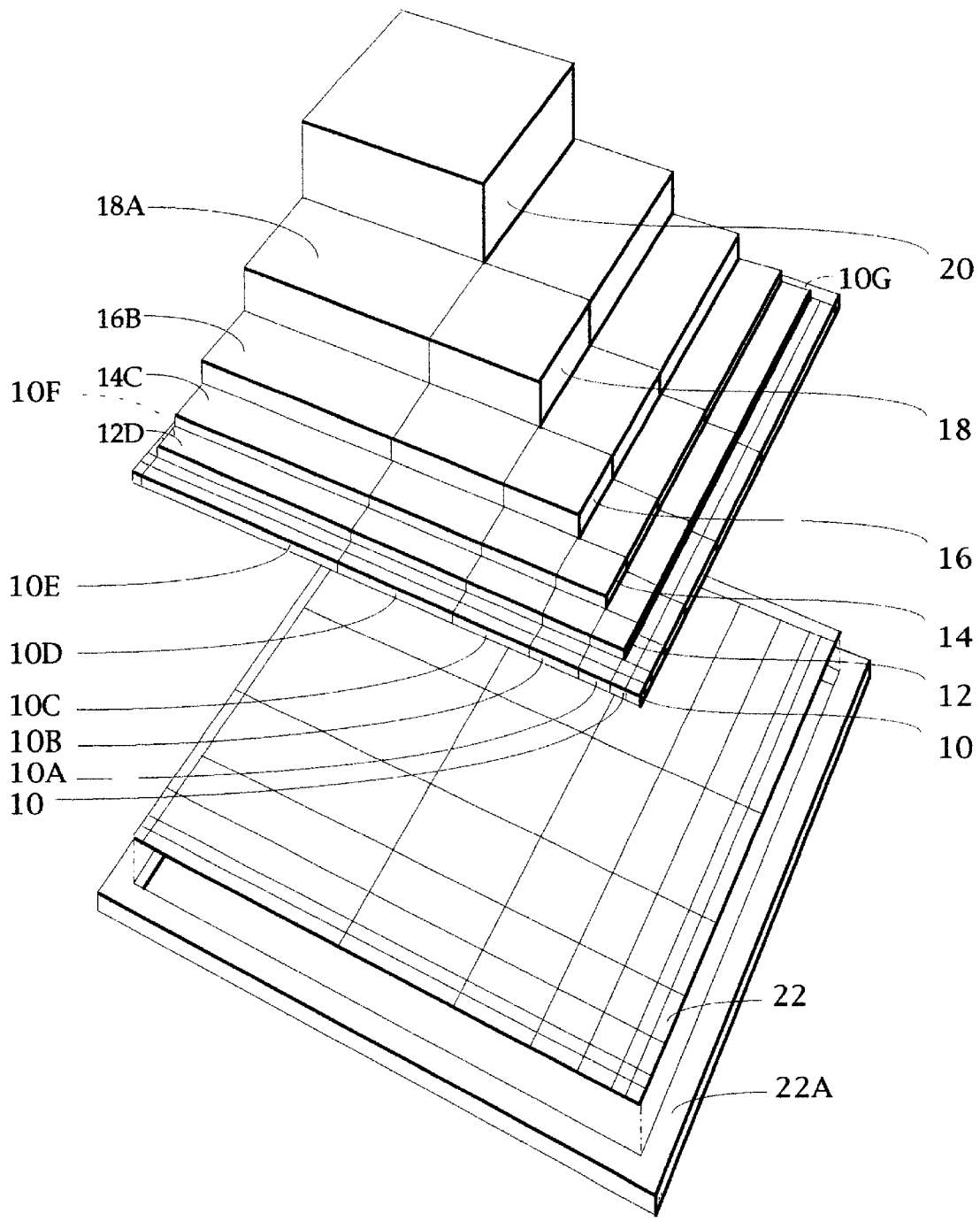
FIG. 1 is a perspective view of the block array of a preferred embodiment of my teaching apparatus including storage tray.

| REFERENCE NUMERALS IN DRAWINGS | |
|---|---|
| blocks | number in set |
| 10 - one-centimeter cube | 6 |
| 10A - 1 × 1 × 2 cm | 5 |
| 10B - 1 × 1 × 3 cm | 4 |
| 10C - 1 × 1 × 5 cm | 4 |
| 10D - 1 × 1 × 8 cm | 5 |
| 10E - 1 × 1 × 13 cm | 4 |
| 10F - 1 × 1 × 21 cm | 1 |
| 10G - 1 × 1 × 34 cm | 1 |
| 12 - two-centimeter cube | 1 |
| 12A - 2 × 2 × 3 cm | 2 |
| 12B - 2 × 2 × 5 cm | 2 |
| 12C - 2 × 2 × 8 cm | 2 |
| 12D - 2 × 2 × 13 cm | 2 |
| 14 - three-centimeter cube | 1 |
| 14A - 3 × 3 × 5 cm | 2 |
| 14B - 3 × 3 × 8 cm | 2 |
| 14C - 3 × 3 × 13 cm | 2 |
| 16 - five-centimeter cube | 1 |
| 16A - 5 × 5 × 8 cm | 2 |
| 16B - 5 × 5 × 13 cm | 2 |
| 18 - eight-centimeter cube | 1 |
| 18A - 8 × 8 × 13 cm | 2 |
| 20 - thirteen-centimeter cube | 1 |
| 22 - holding tray with inscribed surface - dimensions 34 cm × 34 cm | |
| 24 - holding tray frame - inside to inside dimensions 34 cm × 34 cm | |

DETAILED DESCRIPTION OF PREFERRED EMBODIMENT

Referring to the drawings, there is shown in FIG. 1 a perspective view of a preferred embodiment of the present invention in the form of a plurality of fifty-five blocks arranged as they appear in a holding tray 22 and 22A. The blocks and tray with raised frame are preferably constructed of plastic for economy. They may be constructed of wood or any other suitable material of any color, with all blocks in any particular set preferably colored or stained one color. The dimensions of all blocks are related to numbers in the additive series of infinite numbers known as the Fibonacci series, which starts with: 1, 1, 2, 3, 5, 8, 13, 21, 34, 55, . . . etc. For example, an 8 cm×8 cm×13 cm block 18 is related to the numbers 8 and 13 in the Fibonacci series. All blocks included are also related in size as specific multiples of the unity block 10. The sizes of the blocks in the present invention are in centimeters, however any unit of measurement may be used. For reasons of clarity, dotted lines representing hidden parts are not included in FIG. 1 as all individual block sizes are clearly described in FIG. 2.

The Fibonacci series can be visualized sequentially in FIG. 1 in three ways. First, starting with a corner block 10 and traversing left on the lowest array (consisting of the 1 cm cross-section blocks) the series is represented sequentially by the length of each block as in 1 cm, 1 cm, 2 cm, 3 cm, 5 cm, 8 cm, and 13 cm. Thus blocks 10, 10, 10A, 10B, 10C, 10D, and 10E represent in order the numbers 1, 1, 2, 3, 5, 8, and 13 of the Fibonacci series. The volumes of all 1 cm blocks also model the series, e.g. the volume of a 1×1×1 cm block is 1 cubic cm, of a 1×1×2 cm block is 2 cubic cms, and so on. The second manner in which the Fibonacci series is modeled sequentially by the array depicted in FIG. 1 is by the ascending positions of cubes 10, 10, 12, 14, 16, 18, and 20, starting with the corner block 10 and traversing diagonally to the leading corner of each cube. Thus the series numbers 1, 1, 2, 3, 5, 8, and 13 are modeled in ascending sequence diagonally by the two 1 cm cubes, the 2 cm, 3 cm, 5 cm, 8 cm, and 13 cm cubes. The third manner in which the preferred embodiment models the Fibonacci series in sequence is by the widths of each adjacent block. For example, the two adjacent 1 cm×1 cm×13 cm blocks 10E are followed adjacently by the other blocks of 13 cm length, namely: the 2 cm block 12D, 3 cm block 14C, 5 cm block 16B, 8 cm block 18A, and 13 cm wide block 20 respectively.

For reasons of increased versatility, a perpendicular row of 1 cm blocks is included at the end of each sequential array contiguous to the 13 cm blocks. This arrangement, while out of sequence with the Fibonacci series and the order of blocks in the preferred embodiment, allows for the inclusion and modeling of the next two numbers beyond 13 in the Fibonacci series, namely 21 10F and 34 10G (shown in FIG. 2) without adding the increased size and expense incurred if the set were to be extended by including a 21 cm and a 34 cm cube plus the corresponding rectangular solids. To fill out the row that includes the 1 cm×1 cm×21 cm block 10F, four blocks have been added consisting of two 1 cm cubes 10, one 1 cm×1 cm×2 cm block 10A and one 1 cm×1 cm×8 cm block 10D. Also, this addition in length of 1 cm provides for inside to inside dimensions of 34 cm, a Fibonacci number, for the holding tray 22, further enhancing the educational value of the preferred embodiment.

In a preferred embodiment, the tray surface 22, described in FIG. 1, is inscribed or printed with perpendicular grid lines that indicate the position of each block in the configuration shown in FIG. 1. These lines serve to represent, for educational purposes, the two-dimensional plan of the present invention and otherwise facilitate the quick placement of blocks for storage when not in use.

Figure 2:
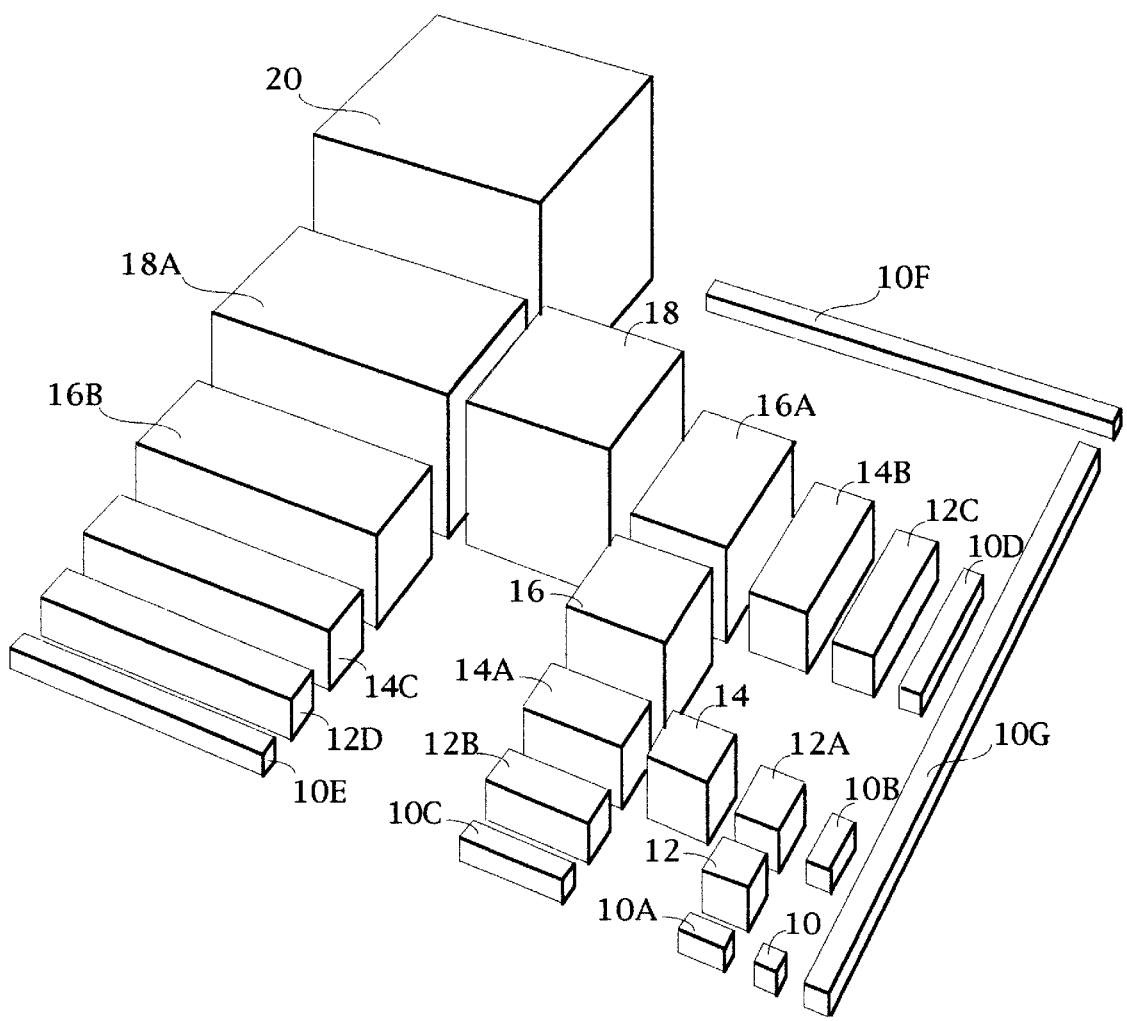
FIG. 2 is a perspective view of the twenty-three different sizes of blocks included in the preferred embodiment of fifty-five blocks.

Referring now to FIG. 2, which further describes the twenty-three different sized blocks included in the basic set of fifty-five blocks of the preferred embodiment. Blocks 12A, 14A, 16A, and 18A are the blocks included in the preferred embodiment that most closely model the ratio of the Golden Section (1:1.618) in their width to length relationships. For example, block 12A, with dimensions of 2×2×3 cm has a width to length ratio of 1:1.5. Blocks 14A, 16A, and 18A come increasingly closer to approximating the Golden Section ratio with width to length ratios of 1:1.667, 1:1.6, and 1:1.625 respectively.

The remaining blocks described in FIG. 2 (blocks 12B, 12C, 14B, and 16B) are integral elements in the preferred embodiment of the present invention, their function becoming evident in the description of the teaching device in operation.

Figure 3:
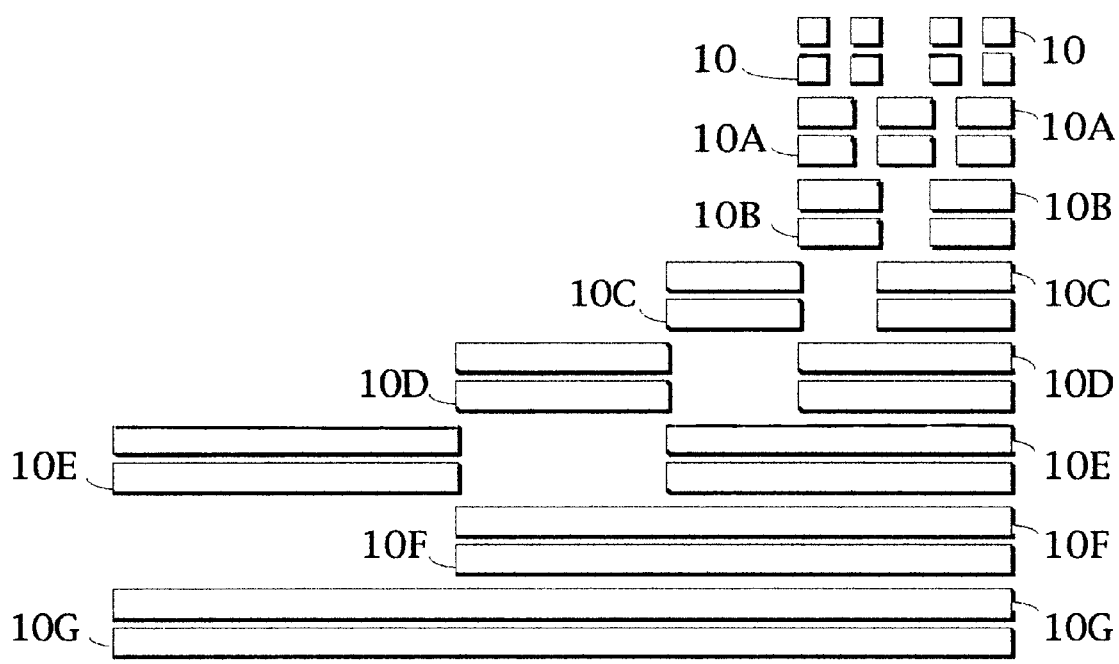
FIG. 3 is a top view of an additional embodiment consisting of twenty-four different length blocks of 1 cm cross section.

Additional Embodiment—FIG. 3

An additional embodiment is shown in FIG. 3 comprising 34 of the 1 cm blocks (10, 10A, 10B, 10C, 10D, 10E, 10G, 10H) previously described in FIGS. 1 and 2. This economical embodiment is intended to augment the preferred embodiment.

Operation

In operation, a number of blocks, selected from the total number available in the preferred embodiment, are employed by either teacher or student or both, and arranged in various configurations to model the desired concepts. FIGS. 4–9 describe the blocks in use.

For example, the block formation shown in FIG. 4 illustrates a modeling of the Fibonacci series and the Golden Ratio concepts. Students learn the pattern found in the series and model it using seven blocks 10, 10, 10A, 10B, 10C, 10D, and 10E, of 1 cm cross-section. Students calculate the ratio of the lengths of adjacent blocks illustrated in FIG. 4 starting with blocks 10 and 10 and compare results with the Golden Ratio of 1:1.618.

Similarly, FIG. 5 shows an example of modeling the Fibonacci series comprising cubes 10, 10, 12, 14, 16, 18, and 20 arranged in a linear configuration.

The concept of pattern recognition is shown illustrated in FIGS. 6 and 6-A. The student must ascertain after examining a configuration of various sized blocks, as described in FIG. 6 and FIG. 6-A, what the basic sequence is, whether or not the sequences are equal, e.g. match in number and position, and ascertain how the blocks are repeated as a pattern. In the example shown, the pattern consists of three sequences of four blocks each, starting with blocks 20, 18A, 16B, and 16B as the base sequence, followed on top by blocks 18, 16A, 14B, and 14B, then blocks 16, 14a, 12B and 12B. The pattern described by FIG. 6 is incorrect due to the extra cube added at the top of the configuration. The pattern shown in FIG. 6-A is a corrected pattern in that each sequence contains the same number of proportionally related blocks in identical configurations. The patterns can be designed by the teacher, as well as students when challenging one another, to be as simple or complex as the situation and skill level requires. FIG. 6 and FIG. 6-A illustrate a moderately difficult pattern intended for middle school students. Different configurations can be easily created by changing the size, number, and relative position of the blocks.

Concepts concerning the interrelations between mathematics and other disciplines can be modeled by my invention. The present invention is uniquely suited to the role of modeling these connections due to the fact it is based on a mathematical sequence that is itself proven to be connected to many disciplines.

For example, the cubic block formation shown in FIG. 7 (10,10, 12, 14, 16, 18, 20) illustrates an example of a mathematics and biology connection. The relative shape and growth pattern of a prototypical seashell is substantially modeled. Two blocks (10) of unity dimension are positioned together representing the first two numbers in the Fibonacci series and the beginnings of the nascent shell form. Blocks 12, 14, 16, 18, and 20 are then placed contiguously in sequence, in a right-angled spiral configuration representing the next five numbers in the series. The student can then visualize and illustrate the rounded form of the seashell growing within the confines of the space described by the blocks shown in FIG. 7.

FIGS. 8 and 8-A show examples of modeling the relationship between mathematics and botany. As shown in FIG. 8, 1 cm blocks (10B, 10C, 10D, 10E, and 10F) are arranged in a configuration that substantially models a leaf of ovate form. Similarly, FIG. 8-A shows a modeling of the veining of a leaf, such as a maple or sycamore, using 1 cm blocks (1° C., 10D, 10E, and 10F).

Figure 9:
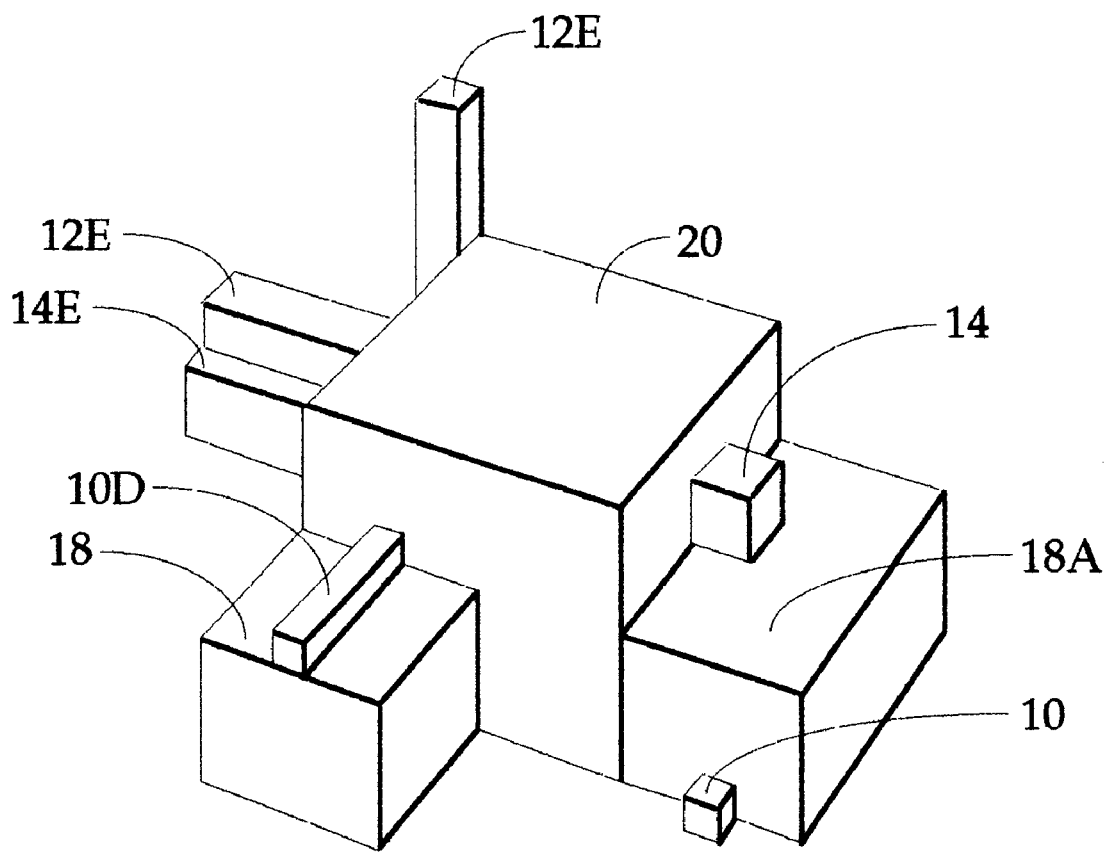
FIG. 9 is a perspective view of nine blocks

Referring to FIG. 9, the teaching apparatus is shown in a block assemblage illustrating the teaching of certain interrelations between mathematics and architecture, particularly with regard to the proportioning of architectural elements for aesthetic purpose. For example, the dimensions of the 13 cm cubic block 20 are proportionate to the dimensions of the 8 cm cubic block 18 by a ratio of 1.625:1, a ratio that closely approximates the harmony of the Golden Ratio of 1.618:1. The dimensions of the 8 cm×8 cm×13 cm rectangular block 18A also approximate the Golden Ratio. All other blocks illustrated in FIG. 9 (10D, 12E, 14, 14E) have dimensions which are multiples of the 1 cm cube 10 by numbers included in the Fibonacci series. This inherent characteristic imparts a relatedness to the block assemblages constructed with my invention similar to proportional relations found in natural organisms that display evidence of the Fibonacci series and the Golden Ratio. Thus, a student could learn the role mathematics plays using this block system to create architectural structures of systematic and cohesive design.

The embodiment illustrated in FIG. 1 is in practice shared by an entire class. For reasons of economy and practicality smaller sets of blocks comprising 1 cm blocks included in the preferred embodiment (10, 10A, 10B, 10C, 10D, 10E, 10F, and 10G) are useful as sub-sets of the preferred embodiment. This allows for more student involvement in a given time when the situation calls for it. For example, while four students are working on one problem with the preferred embodiment at a central table, the remaining students may be working in pairs at their desks on another problem using the 1 cm sub-sets. In this regard, FIG. 3 describes a variation of the preferred embodiment in the form of a set of thirty-four 1 cm blocks. Other variations of the preferred embodiment are also possible such as a set consisting exclusively of the cubes included in said embodiment (10, 12, 14, 16, 18, and 20).

Conclusions, Ramifications and Scope

This system has many advantages over prior-art systems. The blocks of the preferred embodiment are of a number that is neither too few to adversely effect the successful modeling of the desired concept or too many to overwhelm the student in terms of complexity and management. The said embodiment provides a wide variety of twenty-four different rectangular shapes which facilitates the visualization of said concepts by allowing for numerous block configurations.

The aesthetic qualities of the assembled block configurations derive from the following five factors: (a) all blocks are related to one another by a common block of unit size thus enhancing the viewer's perception of a systematic and ordered system (b) all blocks are related in size to the Fibonacci series and the Golden Ratio, two concepts which have long been associated with harmony, nature and aesthetics, (c) the diversity of block shapes and sizes providing visual interest, (d) all block surfaces are smooth and unbroken and (e) of a common color, further enhancing the aesthetic qualities of cohesiveness and unity. These factors combined enable the block system to be employed as an effective teaching apparatus for modeling the connections that exist between mathematics in general, the Fibonacci series and Golden Ratio in particular, and architecture.

The blocks provided in my invention are easily manipulated due to the absence of connectors on the surface of the blocks, features included in many block systems which inherently place limits on where and how blocks are combined with one another. The ease of manipulation also allows for different configurations to be quickly assembled and disassembled, thus allowing for many lessons to be presented in a given time period.

While the above description contains many specifics, these should not be construed as limitations on the scope of the invention, but rather as examples of one preferred embodiment. Many other variations are possible. For example, a computer simulated version of the preferred embodiment can be envisioned. While this block system is designed and is instructive for students of secondary level, it can also be used by adults of all ages.

Accordingly, the reader is requested to determine the scope of the invention not by the embodiment illustrated, but by the appended claims and their legal equivalents.

I claim:

1. A mathematical teaching apparatus representing in length, width, and depth dimensions simultaneously, the first numbers of the Fibonacci series, comprising:
    (a) a plurality of cubes having six different sizes, each having predetermined length, height and width corresponding to one of seven sequential numbers in said series, beginning with 1,
    (b) a plurality of six-sided rectangular blocks, wherein the height and depth of each rectangular block corresponds to the length of one of said cube lengths, and wherein the length of each rectangular block corresponds to one of seven sequential numbers in said series, beginning with 2, such that five different heights and widths and seven different lengths are represented by the rectangular blocks,
    (c) whereby set of said blocks can be arranged in a multitude of differing configurations to aid the teaching and learning of mathematical concepts such as: said series of numbers and the Golden Ratio, pattern recognition, and the relationship of math to biology, botany and architecture.

2. The plurality of blocks of claim 1, further including a square holding tray with raised rim comprising a flat surface having top side of said surface marked with reticulated lines, said lines progressing from a proximal corner in x and y directions equally and separated by spatial intervals corresponding to and representing sequentially the first through seventh numbers of said series.

* * * * *